United States Patent
Phung et al.

(10) Patent No.: US 8,510,422 B2
(45) Date of Patent: Aug. 13, 2013

(54) SYSTEMS AND METHODS FOR EXTENSION OF SERVER MANAGEMENT FUNCTIONS

(75) Inventors: Hai T. Phung, Round Rock, TX (US); Anand Narayanan, Pflugerville, TX (US); Charles D. Stracener, Pflugerville, TX (US); Pritesh F. Prabhu, Round Rock, TX (US); Sanjay Rao, Austin, TX (US); Weijia Zhang, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 830 days.

(21) Appl. No.: 12/587,001

(22) Filed: Sep. 30, 2009

(65) Prior Publication Data

US 2011/0078293 A1    Mar. 31, 2011

(51) Int. Cl.
*G06F 15/177* (2006.01)

(52) U.S. Cl.
USPC .............................................. 709/222; 713/1

(58) Field of Classification Search
None
See application file for complete search history.

(56) References Cited

U.S. PATENT DOCUMENTS

| | | | |
|---|---|---|---|
| 5,603,005 A * | 2/1997 | Bauman et al. | 711/124 |
| 5,717,942 A * | 2/1998 | Haupt et al. | 712/13 |
| 6,108,697 A | 8/2000 | Raymond et al. | |
| 6,144,992 A | 11/2000 | Turpin et al. | |
| 6,298,443 B1 | 10/2001 | Colligan et al. | |
| 6,408,334 B1 * | 6/2002 | Bassman et al. | 709/223 |
| 6,470,446 B1 | 10/2002 | Beelitz et al. | |
| 6,519,679 B2 | 2/2003 | Devireddy et al. | |
| 6,763,458 B1 * | 7/2004 | Watanabe et al. | 713/100 |
| 6,854,122 B1 * | 2/2005 | Sheriff et al. | 719/316 |
| 6,973,587 B1 | 12/2005 | Maity et al. | |
| 7,028,138 B2 | 4/2006 | Ali et al. | |
| 7,216,200 B2 | 5/2007 | Zhang et al. | |
| 7,272,815 B1 * | 9/2007 | Eldridge et al. | 717/101 |
| 7,360,211 B2 | 4/2008 | Hyden et al. | |
| 7,426,052 B2 | 9/2008 | Cox et al. | |
| 7,430,592 B2 | 9/2008 | Schmidt et al. | |
| 7,526,541 B2 * | 4/2009 | Roese et al. | 709/223 |
| 7,610,575 B2 * | 10/2009 | Sproule | 717/103 |
| 7,706,369 B2 * | 4/2010 | Roese et al. | 370/389 |
| 7,739,372 B2 * | 6/2010 | Roese et al. | 709/223 |
| 7,739,402 B2 * | 6/2010 | Roese et al. | 709/242 |
| 7,765,371 B2 | 7/2010 | Abels et al. | |
| 7,805,533 B2 * | 9/2010 | Burns et al. | 709/230 |

(Continued)

OTHER PUBLICATIONS

Warren Togami, "Remote Conversion to Linux Software RAID-1 for Crazy Sysadmins HOWTO", 2004, 11 pgs.

(Continued)

*Primary Examiner* — Ninos Donabed
(74) *Attorney, Agent, or Firm* — O'Keefe, Egan, Peterman & Enders LLP

(57) ABSTRACT

Systems and methods that may be implemented to provide a plug-in architecture framework to allow extension of server management functionalities in a unified extension firmware interface ("UEFI") environment using available remote access controller memory space. The disclosed systems and methods may be implemented to provide a hardware and software interface to allow use of a plug-in framework in the embedded system management that may be run under the BIOS firmware and the UEFI environment. The disclosed systems and methods may also be implemented to provide a server management architecture that may be modified and enhanced over time, and/or that may also be employed to extend availability of the server management framework to third parties, as well as to extend support to original equipment manufacturer ("OEM") servers.

18 Claims, 4 Drawing Sheets

(56) References Cited

U.S. PATENT DOCUMENTS

| | | | |
|---|---|---|---|
| 7,877,614 B2* | 1/2011 | Frenkiel et al. | 713/189 |
| 7,895,428 B2* | 2/2011 | Boland et al. | 713/2 |
| 7,898,977 B2* | 3/2011 | Roese et al. | 370/254 |
| 7,945,945 B2* | 5/2011 | Graham et al. | 726/3 |
| 8,086,834 B2 | 12/2011 | Brisky et al. | |
| 8,191,107 B1* | 5/2012 | Frattura et al. | 726/1 |
| 2003/0216143 A1* | 11/2003 | Roese et al. | 455/456.1 |
| 2004/0162857 A1 | 8/2004 | Butts | |
| 2005/0027837 A1* | 2/2005 | Roese et al. | 709/223 |
| 2005/0055688 A1 | 3/2005 | Barajas et al. | |
| 2005/0066015 A1 | 3/2005 | Dandekar et al. | |
| 2005/0076245 A1* | 4/2005 | Graham et al. | 713/201 |
| 2005/0172280 A1 | 8/2005 | Ziegler et al. | |
| 2005/0237996 A1* | 10/2005 | Sakuraba et al. | 370/351 |
| 2006/0018505 A1 | 1/2006 | Cherian et al. | |
| 2006/0031936 A1* | 2/2006 | Nelson et al. | 726/23 |
| 2006/0036730 A1* | 2/2006 | Graham et al. | 709/224 |
| 2006/0048142 A1* | 3/2006 | Roese et al. | 717/176 |
| 2006/0075093 A1* | 4/2006 | Frattura et al. | 709/224 |
| 2006/0190532 A1 | 8/2006 | Chadalavada | |
| 2006/0212143 A1 | 9/2006 | Nguyen et al. | |
| 2007/0124407 A1* | 5/2007 | Weber et al. | 709/212 |
| 2007/0162695 A1 | 7/2007 | Ali et al. | |
| 2008/0002694 A1 | 1/2008 | Brahmaroutu et al. | |
| 2008/0033972 A1* | 2/2008 | Yin et al. | 707/101 |
| 2008/0126551 A1* | 5/2008 | Conner et al. | 709/230 |
| 2008/0155094 A1* | 6/2008 | Roese et al. | 709/224 |
| 2008/0201501 A1* | 8/2008 | Partani et al. | 710/60 |
| 2009/0037655 A1 | 2/2009 | Cherian et al. | |
| 2010/0268925 A1 | 10/2010 | Brisky et al. | |
| 2010/0306773 A1* | 12/2010 | Lee et al. | 718/1 |
| 2011/0072280 A1 | 3/2011 | Chiasson et al. | |
| 2011/0078293 A1* | 3/2011 | Phung et al. | 709/222 |
| 2011/0173427 A1 | 7/2011 | Merkin et al. | |
| 2011/0289350 A1 | 11/2011 | Andrews et al. | |
| 2011/0296404 A1 | 12/2011 | Zhang et al. | |
| 2012/0110262 A1 | 5/2012 | Zhang et al. | |
| 2012/0198245 A1 | 8/2012 | Mundt et al. | |
| 2012/0317633 A1* | 12/2012 | O'Donnell et al. | 726/10 |

OTHER PUBLICATIONS

"Remote Raid/Mirror", HTMICenter, Printed From Internet Jul. 22, 2010, 2 pgs.

Power6 Information, "Installing an HA-two system RAID Configuration", Printed From Internet Jul. 22, 2010, 4 pgs.

Chiasson et al., "Systems and Methods for Time-Based Management of Backup Battery Life in Memory Controller Systems", Filed Sep. 21, 2009, U.S. Appl. No. 12/586,368, 33 pgs.

Zhang et al., "Systems and Methods for Remote Raid Configuration in an Embedded Environment", Filed Oct. 27, 2010, U.S. Appl. No. 12/925,673, 31 pgs.

Wikipedia, "License Manager" Printed from Internet Jun. 20, 2012, 2 pgs.

Zhang et al., "Systems and Methods for Out-Of-Band Backup and Restore of Hardware Profile Information", U.S. Appl. No. 13/365,901, filed Feb. 3, 2012, 37 pgs.

McNeill, "Virtual Machine Asynchronous Patch Management", U.S. Appl. No. 13/210,552, filed Aug. 16, 2011, 17 pgs.

Karandikar et al., "System and Method for Providing an Image to an Information Handling System", U.S. Appl. No. 13/174,221, filed Jun. 30, 2011, 35 pgs.

Andrews et al., "System and Method for Removable Network Attached Storage Enabling System Recovery From Backup", U.S. Appl. No. 13/187,219, filed Jul. 20, 2011, 30 pgs.

Zhang et al., "Systems and Methods for Intelligent System Profile Unique Data Management", U.S. Appl. No. 13/618,666, filed Sep. 14, 2012, 32 pgs.

Harmer, "Methods and Systems for Providing Manufacturing Mode Detection and Functionality in a UEFI BIOS", U.S. Appl. No. 12/228,499, filed Aug. 13, 2007, 20 pgs.

IBM, "Navigator for I", Printed From Internet May 26, 2009, 3 pgs.

IBM, "IBM iSeries Navigator System Management Plug-In for SAP", Printed From Internet May 26, 2009, 1 pg.

Business Wire; Business Services Industry, "F5 and Oracle Collaborate to Release Big-Ip Load Balancer System Management Plug-In for Oracle Enterprise Manager lOg Grid Control", Oct. 31, 2005, 10 pgs.

Highbeam Research, "Nimsoft Team Up With Oracle", Printed From Internet May 26, 2009, 4 pgs.

All Business, "Oracle Releases F5 Management Plug-In Via iControl", Printed From Internet May 26, 2009, 4 pgs.

* cited by examiner

```xml
<?xml version="1.0" encoding-"ISO-8859-1"?>
<!DOCTYPE DEFINITON SYSTEM "ApplicationDefinition.dtd">
<DEFINITION>

<!-- Main menu -->
    <STRING_ENTRY TEXTID="STR_HardwareUpdate" ID="101" VALUE="Hardware Update"/>
    <STRING_ENTRY TEXTID="STR_HardwareConfig" ID="102" VALUE="Hardware Configuration"/>
    <STRING_ENTRY TEXTID="STR_OSDeployment" ID="103" VALUE="OS Deployment"/>
    <STRING_ENTRY TEXTID="STR_Diagnostics" ID="104" VALUE="Diagnostics"/>
    <STRING_ENTRY TEXTID="STR_UserSettings" ID="105" VALUE="User Settings"/>
    <STRING_ENTRY TEXTID="STR_PartReplacement" ID="106" VALUE="Part Replacement"/>
    <STRING_ENTRY TEXTID="STR_MM_FieldServices" ID="107" VALUE="Your text here"/>

<FILE_TABLE>
    <FILE_ENTRY TEXTID="FILE_BackGround1" ID="10" VALUE="Background1.bmp"/>
    <FILE_ENTRY TEXTID="FILE_BackGround2" ID="11" VALUE="Background2.bmp"/>
    <FILE_ENTRY TEXTID="FILE_LeftBtnNormal" ID="12" VALUE="left_button_normal.bmp"/>
    <FILE_ENTRY TEXTID="FILE_LeftBtnSelected" ID="13" VALUE="left_button_selected.bmp"/>

<FILE_ENTRY TEXTID="FILE_RightBtnNormal" ID="14" VALUE="right_button_normal.bmp"/>
    <FILE_ENTRY TEXTID="FILE_RightBtnSelected" ID="15" VALUE="right_button_selected.bmp"/>
    <FILE_ENTRY TEXTID="FILE_SmallBtnNormal" ID="16" VALUE="small_button_normal.bmp"/>
    <FILE_ENTRY TEXTID="FILE_SmallBtnSelected" ID="17" VALUE="medium_button_selected.bmp"/>
    <FILE_ENTRY TEXTID="FILE_BackGround0" ID="22" VALUE="Background0.bmp"/>
    <FILE_ENTRY TEXTID="FILE_BackGround3" ID="23" VALUE="Background3.bmp"/>

</FILE_TABLE>
```

Manage GUI properties via XML profile

*FIG. 3*

```xml
<?xml version="1.0" encoding-"utf-8"?>
<Catalog BuildDate="Tue Nov  4  11:42:33  2008"
</SubSystem>
    <Subsystem Code="NI" Name="Network">
        <Device Name="NetXtreme II Family of Adapters" Vendor="Broadcom">
            <Release ProjectDescription="Driver" ProjectType="DRVR" ReleaseID="r193420">
                <Package DestPath="oemdrv" OS="rh50" SrcPath="r200928/default" />
                <Package DestPath="oemdrv" OS="rh50_64" SrcPath="r200928/default" />
            </Release>
</SubSystem>
    <Subsystem Code="SF" Name="SAS RAID">
        <Device Name="CERC 6/i Integrated" Vendor"Dell">
<OSMap>
    <OS name="Windows Server 2003 sp2" tag="w2003" DriverPackSize="29" VolLabel= oemdrv">
        <Validmedia Bootable="true"></Validmedia>
    </OS>
    <OS name="Windows Server 2008" tag="w2008" DriverPackSize="29" VolLabel= oemdrv">
        <Validmedia Bootable="true"></Validmedia>
    </OS>
    <OS name="Red Hat Linux 5.2 32-bit" tag="rh50" DriverPackSize="29" VolLabel= oemdrv">
        <Validmedia Bootable="true"></Validmedia>
    </OS>
    <OS name="Red Hat Linux 5.2 64-bit" tag="rh50_64" DriverPackSize="29" VolLabel= oemdrv">
        <Validmedia Bootable="true"></Validmedia>
    </OS>
</OSMap>
</Catalog>
```

- Supported device drivers are managed via XML attributes
- Supported OS list is managed via XML attributes Manage OS Deployment via XML profile

*FIG. 4*

SYSTEMS AND METHODS FOR EXTENSION OF SERVER MANAGEMENT FUNCTIONS

FIELD OF THE INVENTION

This invention relates generally to information handling systems and, more particularly, to extension of server management functions in information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often configured as servers. Such information handling systems are typically provided with server management functions that allow for server updates for firmware, BIOS, driver upgrades, server configuration, operating system deployment program for installation of the operating system on the server; and diagnostic functions to monitor the health status of the server. Programming for server management functions are typically loaded onto embedded flash memory of a server embedded remote access controller, such as an integrated Dell Remote Access Controller (iDRAC) available from Dell Products L.P. of Round Rock, Tex. A graphical user interface (GUI) may be provided to allow a user to control loading of server management functions as an image from the flash memory device which is embedded in the motherboard of the system.

Extension of server management functions (e.g., to change the properties of the server graphic user interface ("GUI"), to add support for additional operating systems in the OS deployment, or to add support for additional servers (original equipment manufacturer "OEM servers") in a typical conventional server may be attempted but is complicated by the following factors. In a typical server, remote access controller flash memory device resources are limited (e.g., having an entire storage capacity of 1 gigabyte), and the amount of memory that is allocated for system management application is also typically limited (e.g., about 20 megabytes). The remote access controller flash memory device is typically managed by the remote access controller sub-system and is not open to the host system. System management functions run under a unified extensible firmware interface ("UEFI") environment (which is provided by the BIOS firmware), and the infrastructure functions and library are enclosed. An extended understanding and knowledge of the current server management architecture and design are required due to the complexity of the component interfaces, which include remote access controller subsystem, BIOS firmware, device driver installation, etc.

SUMMARY OF THE INVENTION

Disclosed herein are systems and methods that may be implemented to provide a plug-in architecture framework to allow extension of server management functionalities (e.g., Dell unified server configurator ("USC") server management functionalities available from Dell Products L.P. of Round Rock, Tex.) in a unified extensible firmware interface ("UEFI") environment (e.g., by a third party) by leveraging available remote access controller Core or optional flash memory space. Among other things, the disclosed systems and methods may be implemented to provide a hardware and soft-ware interface to allow use of a plug-in framework in the embedded system management (e.g., of a server or other host computer information handling system) that may be run under the BIOS firmware and the UEFI environment. The disclosed systems and methods may also be implemented to provide a USC server management architecture that may be modified and enhanced over time, and/or that may also be employed to extend availability of the USC server management framework to third parties (e.g. to make it easy for third parties to customize server management functions to suit their preference and/or to host their own service on newly shipped information handling systems), as well as to extend support to original equipment manufacturer ("OEM") servers.

In one embodiment, the disclosed systems and methods may be implemented with an information handling system configured as a blade server that includes an embedded remote access controller and associated embedded persistent storage to provide server management functions. Examples of server management functions that may be so provided include, but are not limited to, server updates for firmware and/or BIOS, upgrades for drivers; server configuration changes or modifications; programming for deployment of an operating system ("OS") for the OS installation on a server; diagnostic function's to monitor the health status of a server, etc. In one exemplary embodiment, the disclosed systems and methods may be employed to allow third parties to utilize the flash memory resources of the server embedded remote access controller to extend the current or existing system management functions for a server, e.g., to allow a third party to change the properties of the server graphic user interface ("GUI"), to add support for additional operating systems in the OS deployment, or to add support for additional servers (original equipment manufacturer "OEM servers") and devices, etc.

In one respect, disclosed herein is an information handling system, including: at least one processing device; at least one external input/output (I/O) interface coupled to the at least one processing device, the external I/O interface being configured for coupling to one or more devices that are external to the information handling system; a remote access controller coupled to the external I/O interface and to the at least one processing device; persistent storage coupled to the remote access controller; and a server management framework present on the persistent storage, the server management framework including one or more server management functions that each include a configuration layer, the server management framework being configured to load the server management functions on the at least one processing device of the information handling system. The server management framework may be further configured to access a configuration plug-in from one or more external devices across the external I/O interface, the configuration plug-in including a configuration layer. The server management framework may also be configured to extend the configuration layer of the server management framework across the external I/O interface to include the configuration layer of the configuration plug-in, and then load the server management functions on the at least one processing device with the server management functions extended to include the configuration layer of the configuration plug-in.

In another respect, disclosed herein is a computing system, including an information handling system that includes: at least one processing device, at least one external input/output (I/O) interface coupled to the at least one processing device, a remote access controller coupled to the external I/O interface and to the at least one processing device, persistent storage coupled to the remote access controller, and a server management framework present on the persistent storage, the server management framework including one or more server management functions that each include a configuration layer, the server management framework being configured to load the server management functions on the at least one processing device of the information handling system. The computing system may also include one or more external devices coupled to the external I/O interface of the information handling system. The server management framework may be further configured to access a configuration plug-in from the one or more external devices across the external I/O interface, the configuration plug-in including a configuration layer. The server Management framework may also be configured to extend the configuration layer of the server management framework across the external I/O interface to include the configuration layer of the configuration plug-in, and then load the server management functions on the at least one processing device with the server management functions extended to include the configuration layer of the configuration plug-in.

In yet another respect, disclosed herein is a method of extending server management functions in an information handling system. The method may include providing an information handling system that includes: at least one processing device, at least one external input/output (I/O) interface coupled to the at least one processing device, a remote access controller coupled to the external I/O interface and to the at least one processing device, persistent storage coupled to the remote access controller, and a server management framework present on the persistent storage, the server management framework including one or more server management functions that each include a configuration layer. The method may also include: coupling the external I/O interface to one or more devices that are external to the information handling system; using the server management framework to load the server management functions on the at least one processing device of the information handling system; using the server management framework to access a configuration plug-in across the external I/O interface from the one or more external devices, the configuration plug-in including a configuration layer; using the server management framework to extend the configuration layer of the server management framework across the external I/O interface to include the configuration layer of the configuration plug-in; and using the server management framework to then load the server management functions on the at least one processing device with the server management functions extended to include the configuration layer of the configuration plug-in.

BRIEF DESCRIPTION OF THE DRAWINGS

FIG. 3 illustrates management of GUI properties via XML profile according to one exemplary embodiment of the disclosed systems and methods.

FIG. 4 illustrates management of operating system deployment via XML profile according to one exemplary embodiment of the disclosed systems and methods.

DESCRIPTION OF ILLUSTRATIVE EMBODIMENTS

Figure 1:
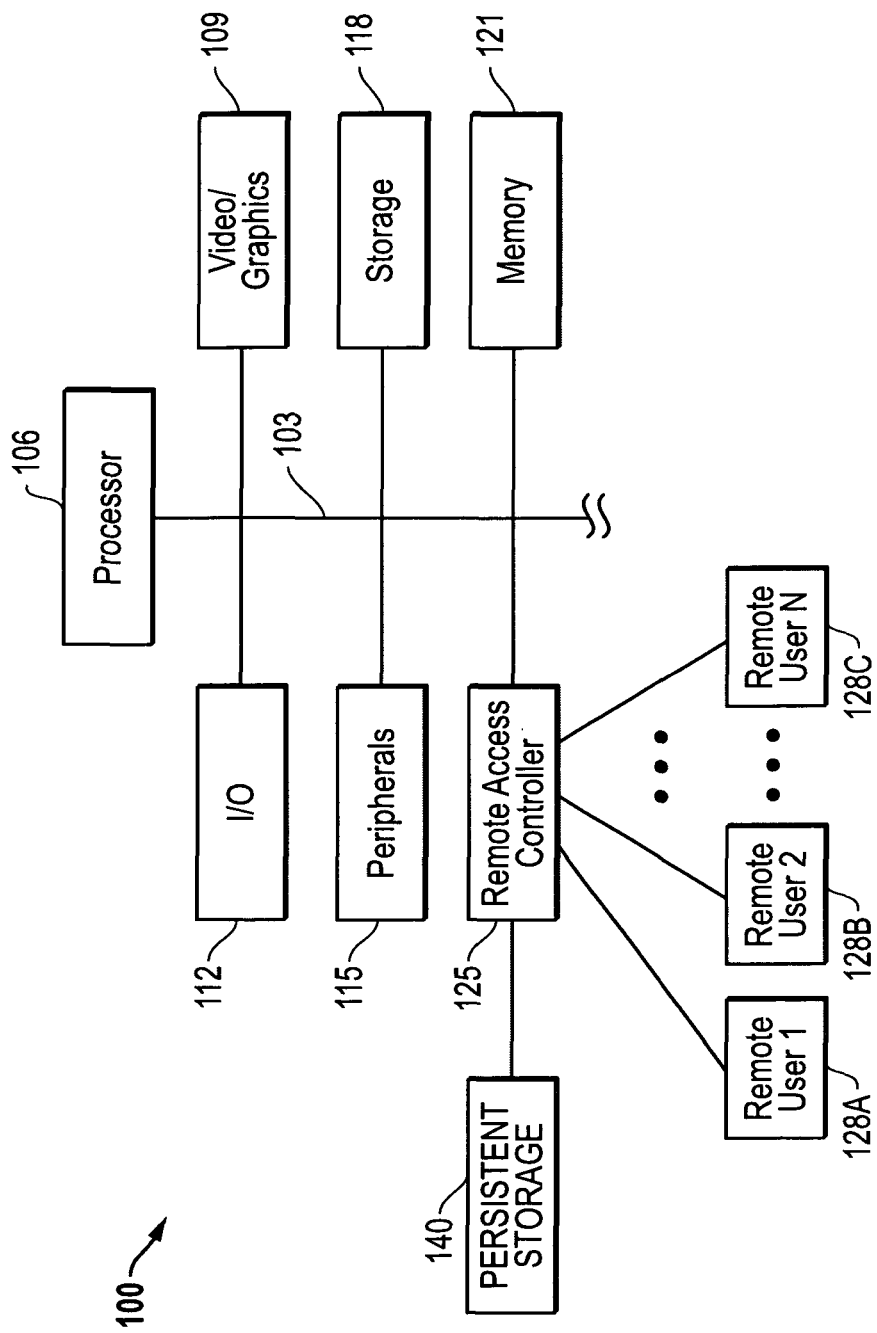
FIG. 1 is a simplified block diagram of an information handling system according to one exemplary embodiment of the disclosed systems and methods.

FIG. 1 is a block diagram of an information handling system 100 according to one exemplary embodiment of the disclosed systems and methods. System 100 may be, for example, a host or server computer system that includes one or more processors 106, one or more buses or communication media 103, video/graphics hardware 109, storage 118, memory 121, input/output (I/O) 112, peripherals 115, and remote access controller 125. Bus 103 provides a mechanism for the various components of system 100 to communicate and couple with one another. Processor 106, video/graphics 109, storage 118, memory 121, I/O 112 and peripherals 115 may have the structure, and perform the functions known to those of skill in the art. Besides memory 121 (e.g., RAM), processor 106 may include cache memory for storage of frequently accessed data, and storage 118 may include extended memory for processor 106. It will be understood that information handling system may be provided with one or more processing devices that may include processors 106, remote access controller 125, and other optional processing devices. Examples of such processing devices include, but are not limited to, central processing units (CPUs), embedded controllers, microcontrollers, application specific integrated circuits (ASICs), field programmable gate arrays (FPGAs), etc. It will also be understood that the particular configuration of FIG. 1 is exemplary only, and that other information handling system architectures may be employed in the practice of the disclosed systems and methods.

Still referring to FIG. 1, remote access controller 125 provides access to a plurality of remote users 128A-128C. In this regard, remote access controller 125 allows remote users to manage, administer, use, and/or access various resources of host system 100 (e.g., either native or virtual) from a remote location. In the embodiment of FIG. 1, remote users 128A-128C may have in-band or out-of-band access to system 100 as desired. For example, remote users 128A-128C may have access through a local area network (LAN), wide area network (WAN), dial-up modem, etc. In one embodiment, remote access controller 125 may be an integrated Dell Remote Access Controller (iDRAC) available from Dell Products L.P. of Round Rock, Tex. Further information on such a remote access controller may be found in United States Patent Application Publication Number 2006/0212143 and United States Patent Application Publication Number 2006/0190532, each of which is incorporated herein by reference in its entirety. However, it will be understood that other configuration of remote access controllers may be suitably employed in other embodiments.

Figure 2:
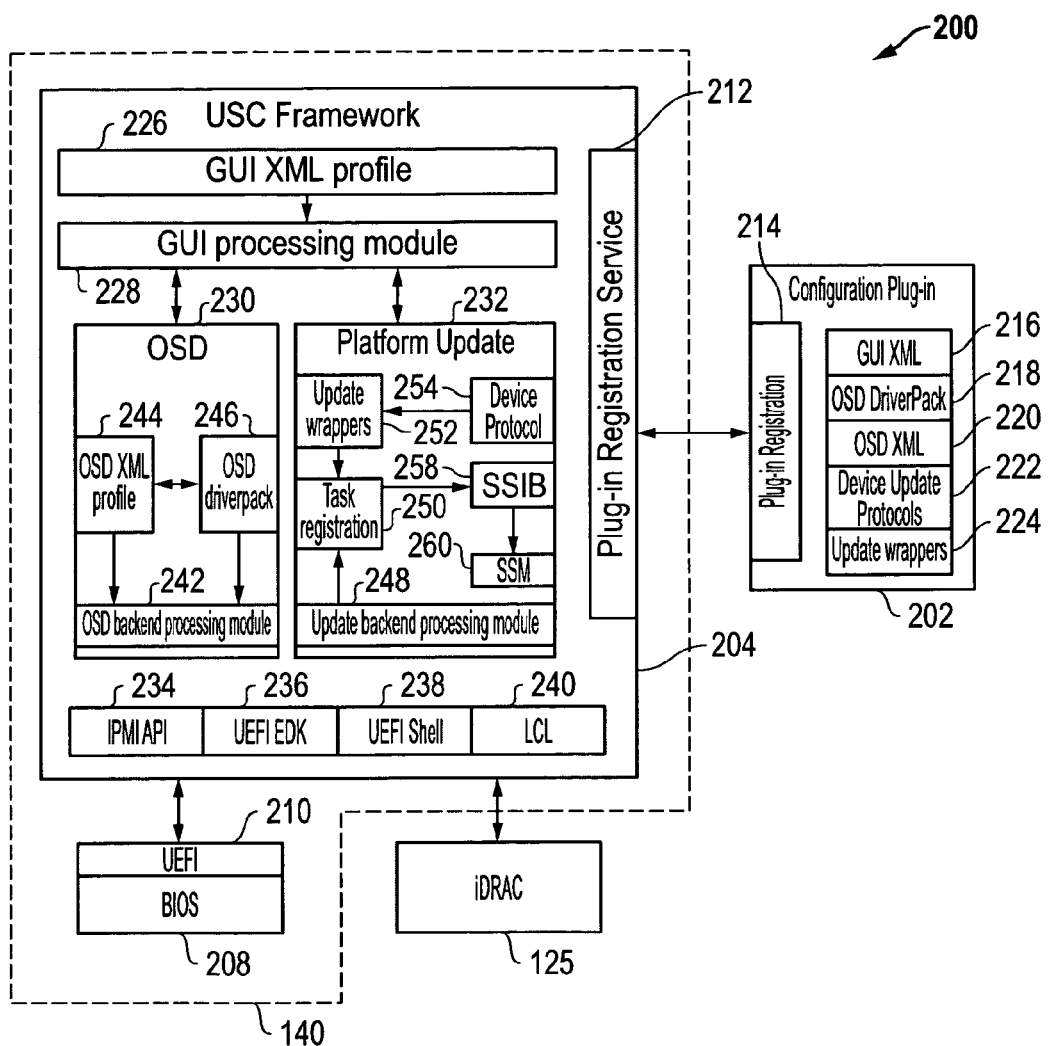
FIG. 2 is a block diagram of remote access controller plug-in architecture according to one exemplary embodiment of the disclosed systems and methods

As further shown, remote access controller 125 is coupled to remote access controller persistent storage 140 (e.g., embedded and partitioned flash memory, Electrically Erasable Programmable Read Only Memory—EEPROM, etc.), upon which one or more server management applications forming part of a USC framework 204 may be stored in addition to other functions, e.g., BIOS 208 and unified extensible firmware interface ("UEFI") 210 of FIG. 2. In the embodiment of FIG. 1, persistent storage 140 is managed by remote access controller 125 and is used utilized for, server management. In one exemplary embodiment, persistent storage 140 may be embedded in the system motherboard and may be, for example, about 1 GB in size.

FIG. 2 is a block diagram of remote access controller plug-in architecture 200 according to one exemplary embodiment of the disclosed systems and methods. In particular, FIG. 2 illustrates how graphical user interface (GUI) functions 216, operating system deployment functions 218, 220 and platform (device) update functions 222, 224 may be extended via a configuration plug-in 202 (e.g., third party plug-in, original manufacturer plug-in, information handling system assembler plug-in, etc.) that may be coupled to server management (USC) framework 204 (i.e., located in one partition of remote access persistent storage 140) using respective mating plug-in registration components 212 and 214, e.g., via USB hardware interface or other suitable external I/O interface of I/O 112 (e.g., such as CD drive interface, DVD drive interface, network connection, via Intelligent Platform Management Interface (IPMI) command or an unattended file definition, etc.). In this embodiment, plug-in registration components 212 and 214 provide the interface to the configuration plug-in 202, i.e., by defining the interface rules and linking configuration layer of the USC framework 204 to configuration layers of the configuration plug-in 202.

Still referring to the exemplary embodiment of FIG. 2, GUI components of configuration plug-in 202 include GUI extensible mark up language ("XML") component 216 that contains desired plug-in GUI configuration instruction information. OS deployment components of configuration plug-in 202 include OS deployment driver pack 218 that contains desired OS drivers and OS deployment XML 220 that contains desired OS deployment instruction information. OS deployment XML 220 may be used to automatically deploy the OS based on, for example, third party customization. Platform update functions of configuration plug-in module 202 include device update protocols 222 that contain device update information, and update wrappers 224 for launching the update protocols.

As shown, server management functions of USC framework 204 of FIG. 2 are designed and provided in a block structure for the illustrated exemplary embodiment. In this regard, each existing server management function of the USC framework 204 shares the same infrastructure layer, as well as the UEFI infrastructure 210, the iDRAC 125, and the BIOS 208 interfaces. Further information on UEFI infrastructure and BIOS interfaces may be found in U.S. patent application Ser. No. 12/228,499 filed Aug. 13, 2008 and entitled "Methods and Systems for Providing Manufacturing Mode Detection and Functionality in a UEFI BIOS" by Harmer, which is incorporated herein by reference in its entirety.

In this embodiment, existing server management functions include existing operating system deployment (OSD) function 230 which itself includes existing operating system deployment XML profile 244 and existing operating system driver pack 246 (e.g., as a zip file in one of the partitions of embedded remote access controller persistent storage 140 (e.g., flash memory device) that contains all the needed system drivers for OS installation/deployment), in addition to operating system backend processing module 242 that functions to install an operation system. Other examples of server management functions that may be a part of USC framework 204 include, but are not limited to, patches, configuration, application deployment, etc.

Existing server management functions of this embodiment also include existing platform update function 232 which itself includes existing update wrappers 252 and existing device update protocols 254, in addition to task registration 250 which functions to sequence the update task, system service information block ("SSIB") 258 which is a file containing tasks that are used for registration of tasks of USC framework 204, system service manager ("SSM") 260 which is a function that is used for processing the tasks contained in SSIB 258 in a first-in first-out manner, and update backend processing module 248 that functions to flash the firmware with update payload. Existing GUI XML profile 226 and existing GUI processing module 228 together comprise a GUI function for generating a GUI menu for controlling server management functionalities.

Also shown in FIG. 2 are intelligent platform management interface ("IPMI") application programming interface ("API") 234 that functions as communication between processes running in different environments and context, UEFI Extensible Firmware Interface development kit ("EDK") 236 that functions to provide low level utilities in the UEFI environment, UEFI shell 238 that functions to encapsulate the UEFI environment, and life cycle log ("LCL") 240 that is a log file residing in iDRAC serial peripheral interface ("SPI") that is used for recording of changes in system configuration.

In the practice of the disclosed systems and methods, additional functions may be easily enabled or disabled from the GUI menu via the GUI XML profile 226. FIG. 3 shows an example of the GUI XML profile 226 and how the function may be enabled or disabled via the XML tags. FIG. 4 shows an example of the operating system deployment XML profile and how an additional operating system may be added or deleted from the support operating system menu via a XML configuration profile. In this regard, each system management block function is designed in layers with the configuration layer (e.g., GUI profile function block 226, blocks 244, 246 of operating system deployment function 230, and blocks 252 and 254 of platform update function 232) manages and provides the ability to extend its respective function. To extend the function, a third party or other party need only provide the configuration layer and write the plug-in registration module 214 to comply with the rules that are specified by the system management (USC) framework 204. Advantageously, an extensive understanding of the infrastructure of USC framework 204 is not required, and the configuration plug-in 202 may be provided from the local USB key or any external media.

When booting information handling system 100 (e.g., server) of FIG. 1, a user may press a hotkey (e.g., F10) or enter a command via other suitable method to cause the plug-in registration service component 212 to search for plug-in registration 214 of configuration plug-in 202. Once found, plug-in registration service component 212 will load the configuration plug-in 202 into a temporary non-volatile storage (e.g., RAMDisk segment of system memory 121). Plug-in registration service component 212 will then link and extend the configuration layer of USC framework 204 (e.g., GUI XML profile function block 226, blocks 244, 246 of operating system deployment function 230, and blocks 252 and 254 of platform update function 232) to the new configuration layer of configuration plug-in 202 (e.g., GUI XML block 216, OS deployment driver pack 218, OS deployment XML 220, device update protocols 222, and update wrappers 224). USC framework 204 then continues to load the rest of the programs into information handling system 100 (e.g., into memory 121, processor cache memory, etc. for processor 106), but now with the functions and properties of GUI profile function block 226 extended with new configuration plug-in layer block 216; the functions and properties of operating system deployment function 230 extended with the new configuration plug-in layer blocks 218, 220; and the functions and properties of platform update function 232 extended with the new configuration plug-in layer blocks 222 and 224.

Advantageously, the disclosed systems and methods may be implemented in one embodiment such that USC server management functions (e.g., such as GUI functions 226 and 228, OS deployment function 230, and platform update function 232) may be easily enhanced via the configuration layer rather than the core infrastructure, thus providing increased stability for an information handling system 100. Moreover, support of the USC system management may be easily extended to OEM servers, and the USC functions may be easily customized. The disclosed systems and methods may also be implemented to allow a displayed logo to be added or removed, and/or the GUI properties may be changed, for example, to suit third party requirements. In one embodiment, third parties may be provided with the ability to customize the USC functions according to their preferences. In this regard, the customization process may be performed easily by extending the configuration layer and does not require an extensive understanding of the USC system management design or architecture.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
at least one processing device;
at least one external input/output (I/O) interface coupled to the at least one processing device;
a remote access controller coupled to the one or more external I/O interfaces and further coupled to the at least one processing device via a communication bus;
persistent storage coupled to the remote access controller with the remote access controller being coupled between the persistent storage and the at least one processing device and one or more external I/O interfaces, the remote access controller being programmed to manage the persistent storage and the remote access controller and the persistent storage each being internal components of the information handling system; and
a server management framework present on the persistent storage, the server management framework including one or more server management functions that each include a configuration layer, the remote access controller being programmed to execute the server management framework to load the one or more server management functions on the at least one processing device of the information handling system;
wherein the remote access controller is further programmed to execute the server management framework to access a configuration plug-in from one or more external devices across the one or more external I/O interfaces, the configuration plug-in including a configuration layer;
wherein the remote access controller is further programmed to execute the server management framework to extend the configuration layer of the server management framework across the one or more external I/O interfaces to include the configuration layer of the configuration plug-in; and
wherein the remote access controller is further programmed to execute the server management framework to then load the one or more server management functions on the at least one processing device with the one or more server management functions extended to include the configuration layer of the configuration plug-in;
wherein the server management framework includes a plug-in registration service, the remote access controller being further programmed to execute the plug-in registration service to access a plug-in registration of the configuration plug-in from one or more external devices across the one or more external I/O interfaces and to execute the plug-in registration service of the server management framework to extend the configuration layer of the server management framework across the one or more external I/O interfaces to include the configuration layer of the configuration plug-in; and
wherein the one or more server management functions comprise a graphical user interface ("GUI") XML profile and GUI processing module that allow a user to control enablement and disablement of other server management functions.

2. The information handling system of claim 1, wherein the persistent storage that is coupled to the remote access controller is divided into a plurality of memory partitions.

3. The information handling system of claim 1, further comprising a system motherboard; and wherein the remote access controller and the persistent storage are embedded internal components on the motherboard of the information handling system.

4. The information handling system of claim 1, further comprising system BIOS firmware residing on the persistent storage; and wherein the remote access controller is further programmed to execute the server management framework to run on the remote access controller under a unified extensible firmware interface ("UEFI") environment provided by the BIOS firmware to access the configuration plug-in across the one or more external I/O interfaces from one or more external devices and to extend the configuration layer of the server management framework across the one or more external I/O interfaces to include the configuration layer of the configuration plug-in.

5. The information handling system of claim 1, wherein the one or more server management functions include at least one of server updates for firmware of the information handling system, server updates for BIOS of the information handling system, upgrades for one or more drivers of the information handling system, server configuration changes or modifications for the information handling system, programming for deployment or installation of an operating system on an information handling system; one or more diagnostic functions to monitor the health status of the information handling system, or a combination thereof.

6. The information handling system of claim 1, wherein the one or more server management functions include programming for deployment or installation of an operating system on the information handling system.

7. A computing system, comprising:
a host information handling system that comprises:
at least one processing device internal to the host information handling system,
at least one external input/output (I/O) interface,
a remote access controller coupled between the one or more external I/O interfaces and the at least one processing device via an internal communication bus,
persistent storage coupled to the remote access controller with the remote access controller being coupled between the persistent storage and the at least one processing device and one or more external I/O interfaces, the remote access controller being programmed to manage the persistent storage and the remote access controller and the persistent storage each being internal components of the information handling system, and
a host server management framework present on the persistent storage, the server management framework including one or more server management functions that each include a configuration layer, the remote access controller being programmed to execute the server management framework to load the one or more server management functions on the at least one processing device of the information handling system; and
one or more remote external devices coupled to the one or more external I/O interfaces of the host information handling system;
wherein the remote access controller is further programmed to execute the host server management framework to access a remote configuration plug-in from the one or more remote external devices across the one or more external I/O interfaces, the remote configuration plug-in including a configuration layer;
wherein the remote access controller is further programmed to execute the host server management framework to extend the configuration layer of the host server management framework across the one or more external I/O interfaces to include the configuration layer of the remote configuration plug-in;
wherein the remote access controller is further programmed to execute the host server management framework to then load the one or more server management functions on the at least one processing device with the one or more server management functions extended to include the configuration layer of the remote configuration plug-in;
wherein the host server management framework includes a plug-in registration service, the remote access controller being further programmed to execute the plug-in registration service to access a plug-in registration of the remote configuration plug-in from one or more remote external devices across the one or more external I/O interfaces to extend the configuration layer of the host server management framework across the one or more external I/O interfaces to include the configuration layer of the remote configuration plug-in; and
wherein the one or more server management functions comprise a graphical user interface ("GUI") XML profile and GUI processing module that allow a user to control enablement and disablement of other server management functions.

8. The system of claim 7, wherein the persistent storage that is coupled to the remote access controller is divided into a plurality of memory partitions.

9. The system of claim 7, wherein the host information handling system further comprises a system motherboard; and wherein the remote access controller and the persistent storage are embedded internal components on the motherboard of the host information handling system.

10. The system of claim 7, further comprising system BIOS firmware residing on the persistent storage; and wherein the remote access controller is further programmed to execute the host server management framework to run on the remote access controller under a unified extensible firmware interface ("UEFI") environment provided by the BIOS firmware to access the remote configuration plug-in from one or more remote external devices across the one or more external I/O interfaces and to extend the configuration layer of the host server management framework across the one or more external I/O interfaces to include the configuration layer of the remote configuration plug-in.

11. The system of claim 7, wherein the one or more server management functions include at least one of server updates for firmware of the host information handling system, server updates for BIOS of the host information handling system, upgrades for one or more drivers of the host information handling system, server configuration changes or modifications for the host information handling system, programming for deployment or installation of an operating system on the host information handling system; one or more diagnostic functions to monitor the health status of the host information handling system, or a combination thereof.

12. The system of claim 7, wherein the one or more server management functions include programming for deployment or installation of an operating system on the host information handling system.

13. A method of extending server management functions in an information handling system comprising:
providing a host information handling system that comprises:
at least one processing device internal to the host information handling system,
at least one external input/output (I/O) interface, a remote access controller coupled between the one or more external I/O interfaces and the at least one processing device via an internal communication bus, persistent storage coupled to the remote access controller with the remote access controller being coupled between the persistent storage and the at least one processing device and one or more external I/O interfaces, the remote access controller being programmed to manage the persistent storage and the remote access controller and the persistent storage each being internal components of the information handling system, and a host server management framework present on the persistent storage, the host server management framework including one or more server management functions that each include a configuration layer;

coupling the one or more external I/O interfaces to one or more remote devices that are external to the host information handling system;

using the host server management framework to load the one or more server management functions on the at least one processing device of the host information handling system;

using the host server management framework to access a remote configuration plug-in across the one or more external I/O interfaces from the one or more remote external devices, the remote configuration plug-in including a configuration layer;

using the host server management framework to extend the configuration layer of the host server management framework across the one or more external I/O interfaces to include the configuration layer of the remote configuration plug-in; and using the host server management framework to then load the one or more server management functions on the at least one processing device with the host one or more server management functions extended to include the configuration layer of the remote configuration plug-in;

wherein the host server management framework includes a plug-in registration service; and wherein the method further comprises using the plug-in registration service to:

access a plug-in registration of the remote configuration plug-in from the one or more remote external devices across the one or more external I/O interfaces, and extend the configuration layer of the host server management framework across the one or more external I/O interfaces to include the configuration layer of the remote configuration plug-in; and wherein the one or more server management functions comprise a graphical user interface ("GUI") XML profile and GUI processing module; and wherein the method further comprises using the GUI XML profile to enable or disable other server management functions.

14. The method of claim 13, wherein the persistent storage that is coupled to the remote access controller is divided into a plurality of memory partitions.

15. The method of claim 13, further comprising providing a system motherboard as a part of the information handling system; and providing the remote access controller and the persistent storage as embedded internal components on the motherboard.

16. The method of claim 13, further comprising providing system BIOS firmware residing on the persistent storage; and using the host server management framework to run on the remote access controller under a unified extensible firmware interface ("UEFI") environment provided by the BIOS firmware to access the remote configuration plug-in from the one or more external devices across the one or more external I/O interfaces and to extend the configuration layer of the host server management framework across the one or more external I/O interfaces to include the configuration layer of the remote configuration plug-in.

17. The method of claim 13, wherein the host one or more server management functions include at least one of server updates for firmware of the host information handling system, server updates for BIOS of the host information handling system, upgrades for one or more drivers of the host information handling system, server configuration changes or modifications for the host information handling system, programming for deployment or installation of an operating system on the host information handling system; one or more diagnostic functions to monitor the health status of the host information handling system, or a combination thereof.

18. The method of claim 13, wherein the one or more server management functions include programming for deployment or installation of an operating system on the host information handling system.

* * * * *